United States Patent [19]

Radovsky

[11] Patent Number: 4,499,615

[45] Date of Patent: Feb. 19, 1985

[54] FLUSH AND REFILL DEVICE

[76] Inventor: Everett S. Radovsky, 4700 N. Main St., Apartment #4J, Fall River, Mass. 02720

[21] Appl. No.: 168,533

[22] Filed: Jul. 14, 1980

[51] Int. Cl.³ .............................................. E03D 1/36
[52] U.S. Cl. ........................................ 4/366; 4/396; 4/398
[58] Field of Search ................. 4/300, 366, 367, 378, 4/393, 394–398, 405, 407, 412, 413, 415

[56] References Cited

U.S. PATENT DOCUMENTS

| | | | |
|---|---|---|---|
| 2,729,826 | 1/1956 | Downin | 4/398 |
| 3,022,516 | 2/1962 | Trafton | 4/398 |
| 3,076,974 | 2/1963 | Sorensen | 4/397 |
| 3,934,276 | 1/1976 | Karlsson et al. | 4/366 |
| 3,969,774 | 7/1976 | Karlsson | 4/366 |
| 4,185,339 | 1/1980 | Morales | 4/393 X |

Primary Examiner—Henry K. Artis
Attorney, Agent, or Firm—Wolf, Greenfield & Sacks

[57] ABSTRACT

A flush and refill device for use with a tank having an outlet and a means for refilling the tank with the liquid. The device includes a pair of floats and a guide means for guiding the floats for vertical movement. One of the floats serves as a valve for the tank outlet and the float controls operation of the refilling means.

6 Claims, 4 Drawing Figures

FLUSH AND REFILL DEVICE

BACKGROUND OF THE INVENTION

A wide variety of devices have been used and proposed for controlling the dispensing of a predetermined volume of liquid from a tank and for refilling the tank. For example, a common application for such a device is in a water tank associated with a toilet bowl in which the water flow from the tank outlet into the bowl is controlled by a float valve. The float valve typically is actuated by a handle on the tank which is connected through a linkage to the flat valve. Once actuated, the float valve rises, opening the outlet. As water empties through the tank outlet, the water level drops and, when the tank is almost empty the float valve drops to cover and reseal the tank outlet. The tank is refilled through a refill valve which is connected to and controlled by a float which shuts the refill off when the water in the tank rises to the desired level.

Although a wide variety of such flushing and refill devices are in widespread use, they are not without their difficulties and inconveniences. For example, the float valves usually are formed from a rubber material which, after repeated seating and unseating, may become somewhat deformed so that they do not seal fully and properly over the tank outlet. The tank outlet then may develop a leak which is annoying as well as wasteful of water. Difficulties also are caused by the accumulation of rust and mineral deposits from the water on the parts of the mechanisms. Maintenance or replacement usually is awkward and inconvenient because the device typically is contained closely within the confines of the tank.

It is among the primary objects of the invention to provide an improved flush and refill device which minimizes the above and other difficulties.

SUMMARY OF THE INVENTION

My invention includes a pair of floats, one above the other, and a guide means by which the floats are confined for vertical movement. In the illustrative embodiment of the invention, the floats are in the form of buoyant balls within a vertical guide cage. The lower end of the guide cage is mounted within the tank about the tank outlet. The floats are independent of each other and they move freely within the confines of the vertical guide cage. The lower float serves as a valve to open or close the tank outlet. The upper float controls operation of a refill valve. As the tank empties, the upper float descends with the water level, thus releasing the refill valve mechanism to admit water into the tank. When the tank is nearly empty, the lower float reseals the tank outlet, and the tank will continue to fill up until the upper float engages the refill valve mechanism to shut the refill valve off. The device then is ready for the next cycle of operation by unseating the lower float from the tank outlet. The lower float is unseated by a mechanism operated by an external control, such as a handle.

Among the main objects of the invention is to provide a simplified and less expensive device for flushing and refilling tanks, such as those associated with toilets.

A further object of the present invention is to provide a device which has a minimum number of parts so as to make any repairs that may be required quick, simple and convenient.

Another object of the invention is to provide a device of the type described in which different portions of the lower float may seat against the tank outlet each time the device is operated, thereby minimizing wear on the lower float.

Still another object of the invention is to provide a device of the type described which is substantially trouble-free.

The foregoing objects and advantages of the present invention will be understood moe fully when considered in conjunction with the following description and accompanying drawings.

DETAILED DESCRIPTION OF AN ILLUSTRATIVE EMBODIMENT

Figure 1:
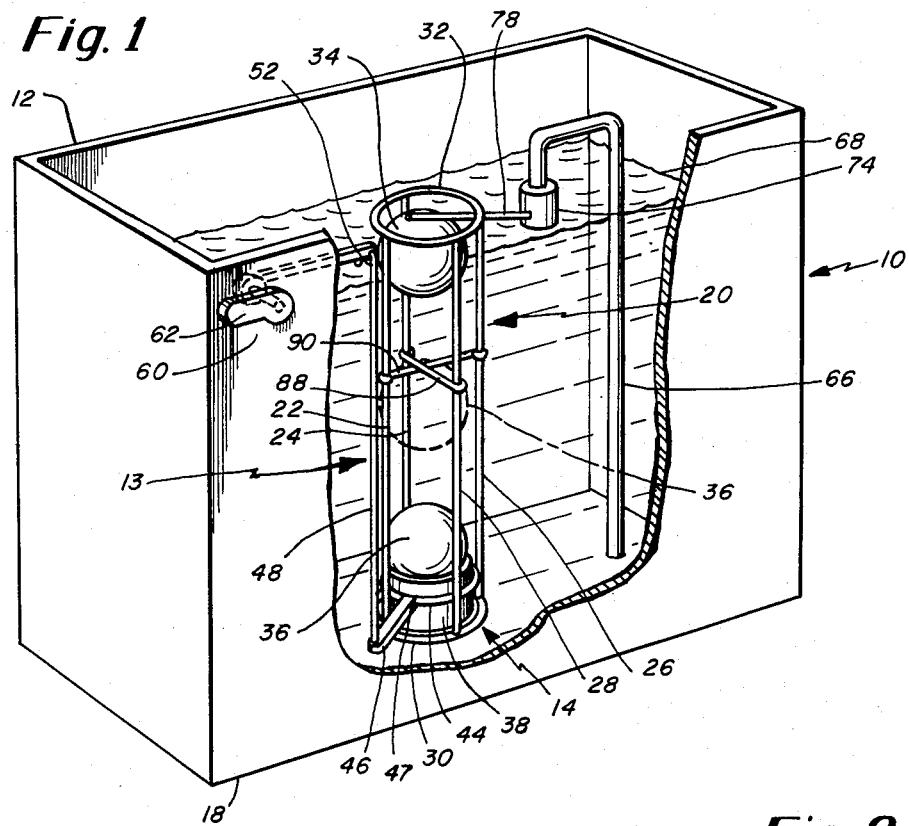
FIG. 1 is a diagrammatic illustration of the device with the tank filled and in readiness for a cycle of operation.
Figure 2:
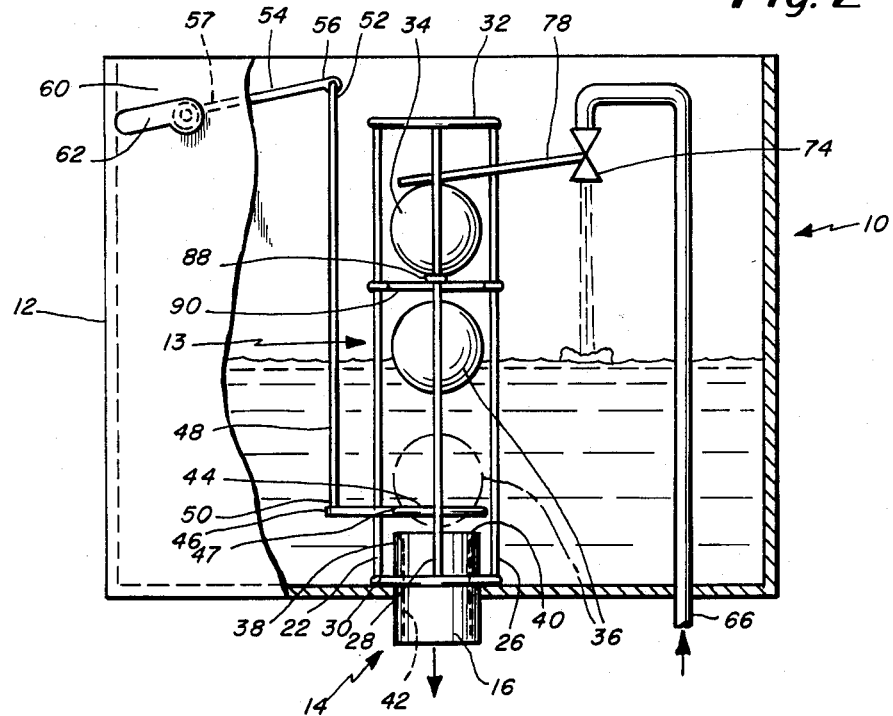
FIG. 2 is a diagrammatic illustration of the device after actuation and while the tank is emptying.
Figure 3:
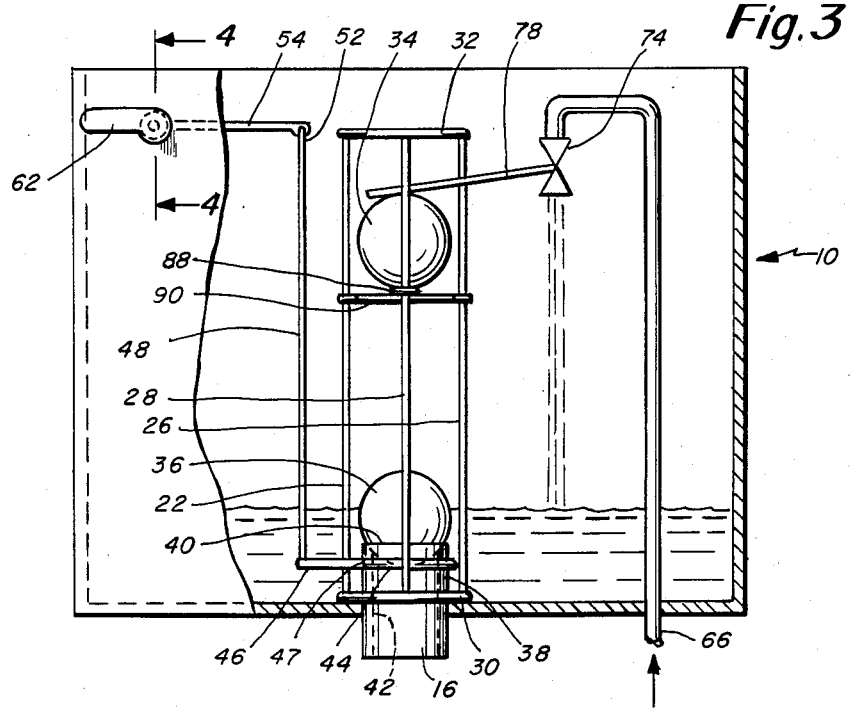
FIG. 3 is a diagrammatic illustration of the device as the float valve reseats to close the tank outlet.
Figure 4:
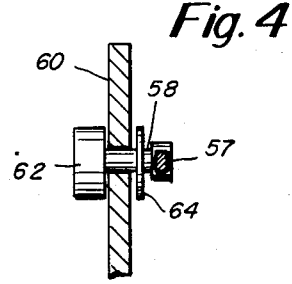
FIG. 4 is an illustration of the operating handle as seen along the line 4—4 of FIG. 3.

The invention is illustrated as being used in a toilet flush mechanism, shown schematically in FIGS. 1-3, in which a toilet tank 10 contains a quantity of water 12 to be released and a flush mechanism 13 for emptying and refilling the tank with water.

The tank 10 has an outlet 14 which consists of a circular pipe 16 extending from the inside of the tank through the tank bottom 18 to a toilet bowl below the tank (not shown). The pipe 16 may extend slightly above the tank bottom 18 within the tank 10. A vertically extending guide 20 may be made in the form of a cage from four vertical wires 22, 24, 26 and 28. The ends of the wires are attached to one of a pair of rings 30, 32. The bottom ring 30 is disposed around and may be detachably connected to the upper end of the pipe 16.

A pair of floats, including an upper float 34 and a lower float 36 are confined within the cage 20 such that as the water level rises and falls within the tank 10 during flushing, the floats 34, 36 are guided for vertical movement. The floats 34, 36 preferably are spherical plastic balls and may be of the same size and buoyancy. However, other shapes, such as cones, may be used.

The inner end 38 of the pipe 16 is provided with a resilient circular valve seat which extends around the pipe opening 42. The seat 40 preferably is made of any of a variety of soft rubber materials. The seat 40 is so disposed on the pipe 16 that the lower float 36 comes into contact with the seat 40 as the float 36 descends within the cage 20.

An unseating device, illustrated diagrammatically in the form of a ring 44 may be disposed around the end 38 of the pipe 16. In the illustrative embodiment, the unseating ring 44 may be disposed in the annular region between the pipe 16 and the lower region of the cage 20. An arm 46 extends from the ring 44 at 47 and the outer end of the arm 46 may be connected to the lower end 50 of a connecting rod 48. The upper end 52 of the connecting rod is pivoted to another end 56 of a link 54. The other end 57 of the link 54 is attached to a short shaft 58 which, when rotated, moves the end 56 of link 54 to operate the connecting rod 48 and rise the unseating ring 44. The shaft 58 may penetrate a wall 60 of the tank 10 and is operated by a handle 62 which is outside of the tank. A flange 64 on a portion of the shaft 58 retains the shaft and the handle 62 in place. Other types of unseating devices may be employed.

The tank 10 is refilled by a water supply pipe 66 which is connected to a refill valve 74. The valve 74 has a moveable actuator 78 which extends over the top of the path of movement of the upper ball 34, so as to be actuated by movement of the upper ball 34.

The device operates in the following manner. When the tank is full of water to the highest desired level 68 (FIG. 1) the upper ball 34 floats in the water while the lower ball 36 is forceably seated against the seat 40 under the influence of the head of water pressure in the tank 10. The buoyancy of the upper float 34 is selected in combination with the type of refill valve 74 and valve actuator so that when the water in the tank has reached the desired level, the upward buoyant force of the upper ball 34 on the actuator 78 will be sufficient to shut off the refill valve 74.

The buoyancy and shape of the lower float 36 is selected so that the weight of the lower float will be sufficient to cause the lower float to seat on the seating ring 40 without requiring the tank to be completely empty. In this regard, it should be noted that the tank never completley empties because the refill valve 74 will be admitting water into the tank at the same but at a slower rate than the rate at which the water flows through the outlet. The weight, shape and buoyancy of the lower float 36 and the shape of the seat 40 should be selected so that the float 36 will descend into full seating engagement with the circular seat 40 before the tank is completely empty, thus fully shutting off water flow through the outlet. Continued filling of the tank, with a rise in the level of water, will not displace the lower float 36 from its seated position on the seat 40 because the weight of the float valve 36 is greater than the maximum buoyant effect of the water on the seated float valve 36. The float 36 remains seated because the buoyant effect of the water can act only on a portion of the float 36 (only atmospheric pressure acts on the bottom of the float within the confines of the seat 40) so that the float 36 cannot be subjected to the full buoyant effect as is the case when the ball floats freely in water.

By way of example only, a spherical float 36, 4 cm. in diameter, weighing 5.1 grams, was used successfully with a circular seat 40 in which the float 36 was seated to a depth of one-quarter of its diameter.

The flush cycle is initiated by operating the handle 62 which causes the link 54 to move upwardly and pull the rod 48 and the ring 44 upwardly to unseat the float 36. The handle then may be released and the ring 44 and the link 54 and rod 48 will fall to their initial positions. The valve 36 floats upwardly and freely within the cage 20 and the water level within the tank 10 drops as the water flows through the tank outlet.

As the tank empties and the upper float 34 descends, the actuator 78 will move downwardly to open the refill valve 74 to admit water to the tank. When the tank 10 is nearly empty (FIG. 3), the lower float 36 seals the outlet and the tank will refill until the upper float 34 shuts off the refill valve 74.

In a preferred embodiment, the descent of the upper float 34 is limited by a stop 80 attached to the cage 20 across the travel path of the balls. The stop may be formed by two rods 88, 90 which are connected to opposite pairs of the vertical wires. This also helps to rigidify the cage wires. The stop is situated such that the upper float 34 may descend at least a distance which is sufficient to open the valve 74 (see FIG. 2). The stop 80 also limits the height to which the lower float 36 can rise, as shown in phantom in FIG. 1.

In the foregoing description of the embodiment of the invention, the floats 34, 36 have been described as being a pair of balls which are freely floatable within the confines of the guide cage. Among the advantages of employing spherical shaped floats is that with each cycle of operation, the lower ball will be free to rotate under the influence of water current in the tank and will reorient itself randomly so that when it engages the seat 40, it will do so in a different attitude each time. This avoids one of the difficulties of prior valves in which the valves tended to reseat in precisely the same attitude each time. As mentioned above, that tends to deform the valve somewhat over a period of time and tends to reduce the effectiveness of the seal.

The floats 34, 36 preferably are identical in shape, size and weight. When the floats are identical, the device is less expensive to manufacture and is easier to assemble and repair.

Having described an embodiment of the invention, it should be apparent to those skilled in the art that other embodiments are contemplated as falling within the scope of this invention. Therefore, the scope of this invention is not limited solely to the embodiment illustrated and described, but rather, is to be determined by the appended claims and their equivalents.

What is claimed is:

1. A device for flushing and refilling a tank, the tank having an outlet and means for refilling the tank with liquid, said refilling means having an actuator, said device comprising:

a pair of substantially identical floats including an upper float and a lower float;

guide means located within the tank for guiding the floats for movement in a substantially vertical direction, one end of the guide means being disposed in proximity to the outlet and in a manner which guides the lower of the floats into alignment with the outlet, said floats being freely floatable within the guide;

the other end of the guide means being located in the tank with respect to the refilling means so as to guide the upper float toward and away from the actuator of the refill means;

the upper float having a buoyancy sufficient to operate the actuator of the refill means to shut the refill means off when the liquid level in the tank reaches a predetermined upper limit;

the weight and shape of the lower float being such that when the lower float is in seating engagement with respect to the tank outlet, the maximum buoyant effect of the liquid in the tank will be insufficient to dislodge the lower float from said seating engagement; and means, independent of the buoyant effect of the liquid in the tank, for dislodging the lower float from its seat on the tank outlet.

2. The device of claim 1 wherein the guide means is a vertically extending cage containing both of the floats.

3. The device of claim 1 wherein a stop is attached to the guide means across the travel path of the floats intermediate the floats.

4. A flushing device for emptying and refilling a tank of water, the tank having an outlet and a refill valve, the device comprising: an upper buoyant ball; a lower, substantially identical, buoyant ball; a vertically extending cage, the cage guiding the balls in a substantially vertical direction; the balls being freely floatable; the lower end of the cage being disposed around the outlet in a manner which guides the lower ball into alignment with the outlet; the upper end of the cage being located within the tank with respect to the refill valve so as to guide the upper ball toward and away from a refill valve actuator; the upper ball having a buoyancy sufficient to operate the refill valve actuator to shut the refill valve off when the water level in the tank reaches a predetermined upper limit; the weight and shape of the lower ball being such that when the lower ball is in seating engagement with respect to the tank outlet, the maximum buoyant effect of the water in the tank will be insufficient to dislodge the lower ball from the seating engagement; and means independent of the buoyant effect of the water in the tank for dislodging the lower ball from its seat on the tank outlet.

5. The device of claim 4 wherein a stop is disposed within the cage intermediate the two balls.

6. The device of claim 4 wherein the means for dislodging the lower ball from its seat on the tank outlet is a ring disposed below the lower ball and around the tank outlet, and means for raising the ring to dislodge the lower ball.

* * * * *